Patented Apr. 14, 1953

2,635,053

UNITED STATES PATENT OFFICE 2,635,053

ADHESIVE COMPOSITION FOR ELECTROPLATING FORMS

Martin Schwartz, New York, N. Y.

No Drawing. Application December 19, 1950, Serial No. 201,583

1 Claim. (Cl. 106—236)

This invention relates to an adhesive composition to be applied to forms which are to be coated with an electrically conducting material and then electroplated.

In the production of dental plates, for example, the process of first taking dental impression with a plastic material such as wax, of coating the impression with a thin layer a current conducting material and of then electroplating the coated impression in an electroplating bath has been employed for a long time. It has been found however, that with many of the best suited impression-taking materials it is difficult to make the current conducting material, which is ordinarily powdered graphite or bronze powder, stick to the impression preparatory to the electroplating step. Ordinary adhesives dissolve or are attacked by the electroplating bath. If an adhesive is to be employed it must be active in very thin layers and be able to evenly coat the impression or other non-conducting article to be electroplated. The adhesive must have wetting and adhesive properties for the conducting powder as well as for the impression material.

An object of this invention therefore is to provide an adhesive composition for coating non-metallic articles to be plated which composition will adhere to the non-metallic articles and the conducting powders and not wash-off or be attacked by electroplating baths.

Another object is to provide a fluid adhesive composition adapted to form a very thin adhesive layer over the surface of an impression material which layer is adapted to secure a thin layer of electrically conducting powders to the impression material.

These objects and others ancillary thereto are obtained by dissolving an adhesive gum together with one or more adhesive balsams and powdered rosin in a volatile solvent. The composition should have the following components in the proportions set forth:

| | |
|---|---|
| Gum mastic _____ oz__ | 1/32–5 |
| Powdered rosin _____ oz__ | 1/64–5 |
| Tincture of benzoin (friar's balsam) or Canadian balsam _____ cc__ | 0–10 |
| Balsam Peru _____ cc__ | 1–20 |
| Solvent to form a fluid solution, for example _____ cc__ | 50–150 |

The gum mastic is essential as an adhesive agent but cannot be employed by itself as it would be dissolved or washed-off by the electroplating bath.

The various balsams in the composition increase and stabilize the stickiness of the gum mastic. As indicated by the above formulation the Canadian balsam or friar's balsam can be omitted or replaced by any balsam or balsam-like material but the balsam Peru is indispensible.

The powdered rosin is an essential ingredient because after the composition has been applied to the article to be electroplated and the solvent evaporated, the rosin gets hard and sets thus preventing the composition from being washed away by the plating solution or bath. The adhesive material or composition must hold and protect the current conducting powder for at least one hour while in contact with the electroplating bath.

Suitable solvents for the ingredients include chloroform, trichlorethane, carbon tetrachloride, ethylene dichloride, methyl acetate, nitroethane, acetone etc.

The composition of the invention is especially suited for the production of adhesive coatings on impressions of alginate and what is known in the dental arts as the hydro-colloid type. The term "hydro-colloid type of impression material," includes those plastic impression materials containing an essential amount of water, (such as gelatin for example) which can be softened by heat to form an impressionable material which rapidly sets on cooling. The adhesive also is effective when applied to molds or impressions made of any non-metallic material, such as wood, plaster, leather, stone, wax, synthetic resins such as methyl methacrylate polymers, etc., zinc oxide. The adhesive has also been formed to be useful in silk screen printing process.

The solution wets the surface of the above named mold materials and can be spread on the surface thereof so as to form a very thin film which is believed to be of the order of not much more than one molecule in thickness. It is realized of course that a thick coating or a coating that is apt to aggregate at certain areas due to surface tension or lack of wetting properties may undesirably change the dimensions of the electroplated product.

The novel features characteristic of this invention are set forth with particularity in the appended claims. The invention itself, however, both as to its organization and its method of operation, together with additional objects and advantages thereof, will best be understood from the following specific example.

Example

A solution is made of the following ingredients:

| | | |
|---|---|---|
| Gum mastic (powdered) | oz | ½ |
| Rosin (powdered) | oz | ¼ |
| Tincture of benzoin (friar's balsam) | cc | 2 |
| Balsam Peru | cc | 5 |
| Chloroform | cc | 125 |

This solution is employed in the following way. An alginate or "hydro-colloid" impression is coated with the above solution and the excess of the solution is shaken off or allowed to drain in order to avoid any liquid pockets in the impression. The coating on the impression is allowed to set for from 1-5 minutes. Bronze or copper powder is gently blown onto the mold and the mold is vibrated to intensify the concentration of powder. The excess powder is then blown off and the coating and powder held thereby is allowed to set for another period of five minutes, for example. The impression is then ready to be plated in the electroplating bath.

The invention provides an adhesive which wets the surface of the impression and forms a very thin adhesive layer thereon adapted to hold electrically conductive powder thereon when the impression is immersed in a copper plating or similar plating bath which may contain a considerable amount of acid for example. Since a better adhesion of the powder is obtained and more powder is adhered to the surface, the electroplating operation is promoted and can be speeded up. Since the layer of the adhesive which is deposited on the impression is very thin the highest accuracy of reproduction is obtained. The speed-up is highly important as the acid in the electroplating bath will attack the impression material and destroy it, rendering the obtained mold unusable. Under the method outlined above an initial plating is obtained in five minutes; this fast plating therefore preserves the impression and its accuracy.

I claim:

An adhesive composition which is adapted to form a very thin layer of metal-powder holding adhesive on non-metallic mold surfaces which adhesive is resistant to attacks by electroplating baths consisting essentially of the following ingredients in the range of proportions indicated:

| | |
|---|---|
| Gum mastic | approximately ½ oz. |
| Rosin (powdered) | approximately ¼ oz. |
| Friar's balsam | approximately 2 cc. |
| Balsam Peru | approximately 5 cc. |
| Chloroform | approximately 125 cc. |

MARTIN SCHWARTZ.

References Cited in the file of this patent

UNITED STATES PATENTS

| Number | Name | Date |
|---|---|---|
| 149,004 | Towne | Mar. 24, 1874 |
| 1,624,575 | Biddle | Apr. 12, 1927 |
| 2,094,308 | Snell | Sept. 28, 1937 |

FOREIGN PATENTS

| Number | Country | Date |
|---|---|---|
| 2,425 | Great Britain | of 1878 |
| 18,072 | Great Britain | of 1891 |
| 21,299 | Great Britain | of 1892 |

OTHER REFERENCES

Metal Industry, October 1944, pages 610-613.